US 10,822,984 B2

(12) United States Patent
Nishikawa et al.

(10) Patent No.: US 10,822,984 B2
(45) Date of Patent: Nov. 3, 2020

(54) SEALING DEVICE

(71) Applicant: Mitsubishi Hitachi Power Systems, Ltd., Kanagawa (JP)

(72) Inventors: Toyoharu Nishikawa, Tokyo (JP); Katsuhisa Hamada, Kanagawa (JP); Yoshihiro Kuwamura, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 175 days.

(21) Appl. No.: 16/062,941

(22) PCT Filed: Oct. 20, 2016

(86) PCT No.: PCT/JP2016/081052
§ 371 (c)(1),
(2) Date: Jun. 15, 2018

(87) PCT Pub. No.: WO2017/110224
PCT Pub. Date: Jun. 29, 2017

(65) Prior Publication Data
US 2019/0003328 A1    Jan. 3, 2019

(30) Foreign Application Priority Data
Dec. 24, 2015   (JP) .................................. 2015-252491

(51) Int. Cl.
*F01D 11/04* (2006.01)
*F01D 11/10* (2006.01)
(Continued)

(52) U.S. Cl.
CPC .............. *F01D 11/04* (2013.01); *F01D 5/081* (2013.01); *F01D 11/001* (2013.01); *F01D 11/10* (2013.01);
(Continued)

(58) Field of Classification Search
CPC ........ F01D 11/04; F01D 5/081; F01D 11/001; F01D 11/10; F02C 7/28; F16J 15/447;
(Continued)

(56) References Cited

U.S. PATENT DOCUMENTS 5,253,976 A    10/1993  Cunha
5,399,065 A *  3/1995  Kudo ..................... F01D 5/187
                                                           415/115
(Continued)

FOREIGN PATENT DOCUMENTS

JP    57-116103    7/1982
JP    59-58701     4/1984
(Continued)

OTHER PUBLICATIONS

Notification of Reason for Refusal dated Jun. 27, 2019 in Korean Application No. 10-2018-7017418, with English translation.
(Continued)

*Primary Examiner* — Aaron R Eastman
(74) *Attorney, Agent, or Firm* — Wenderoth, Lind & Ponack, L.L.P.

(57) ABSTRACT

A sealing device includes a fin, a through hole, and a high pressure fluid supplying unit. The fin extends from a stationary body toward a rotating body in a gap between the stationary and rotating bodies. The fin is not in contact with the rotating body. The through hole is formed to be opened in at least one of the stationary body and the rotating body on an upstream side of the fin in a flow direction of a fluid to flow into the gap between the stationary body and the rotating body. The through hole is opened toward an upstream side of the fluid to flow in the gap between the stationary body and the rotating body. The high pressure fluid supplying unit is configured to supply a high pressure fluid to the gap from the through hole. The high pressure fluid has a higher pressure than the fluid.

6 Claims, 8 Drawing Sheets

(51) Int. Cl.
*F16J 15/447* (2006.01)
*F02C 7/28* (2006.01)
*F01D 5/08* (2006.01)
*F01D 11/00* (2006.01)

(52) U.S. Cl.
CPC ............... *F02C 7/28* (2013.01); *F16J 15/447* (2013.01); *F16J 15/4472* (2013.01); *F05D 2220/30* (2013.01); *F05D 2220/31* (2013.01); *F05D 2240/12* (2013.01); *F05D 2240/14* (2013.01); *F05D 2240/30* (2013.01); *F05D 2240/55* (2013.01); *Y02E 20/16* (2013.01)

(58) Field of Classification Search
CPC ............... F16J 15/4472; F05D 2220/30; F05D 2220/31; F05D 2240/12; F05D 2240/14; F05D 2240/30; F05D 2240/55; Y02E 20/16
See application file for complete search history.

(56) References Cited

U.S. PATENT DOCUMENTS

| | | | |
|---|---|---|---|
| 5,980,202 A * | 11/1999 | Tomita | F01D 11/02 415/115 |
| 6,773,225 B2 | 8/2004 | Yuri et al. | |
| 9,057,279 B2 | 6/2015 | Lotfi et al. | |
| 2010/0008756 A1* | 1/2010 | Inomata | F01D 11/02 415/14 |
| 2011/0274536 A1* | 11/2011 | Inomata | F01D 5/085 415/178 |

FOREIGN PATENT DOCUMENTS

| | | |
|---|---|---|
| JP | 63-205404 | 8/1988 |
| JP | 8-49564 | 2/1996 |
| JP | 2002-227606 | 8/2002 |
| JP | 2003-343206 | 12/2003 |
| JP | 2004-3494 | 1/2004 |
| JP | 2007-120476 | 5/2007 |
| JP | 2008-196522 | 8/2008 |
| JP | 2013-19537 | 1/2013 |
| JP | 2013-185494 | 9/2013 |
| JP | 2015-158190 | 9/2015 |

OTHER PUBLICATIONS

International Search Report dated Jan. 10, 2017 in International (PCT) Application No. PCT/JP2016/081052.
Written Opinion of the International Searching Authority dated Jan. 10, 2017 in International (PCT) Application No. PCT/JP2016/081052.

* cited by examiner

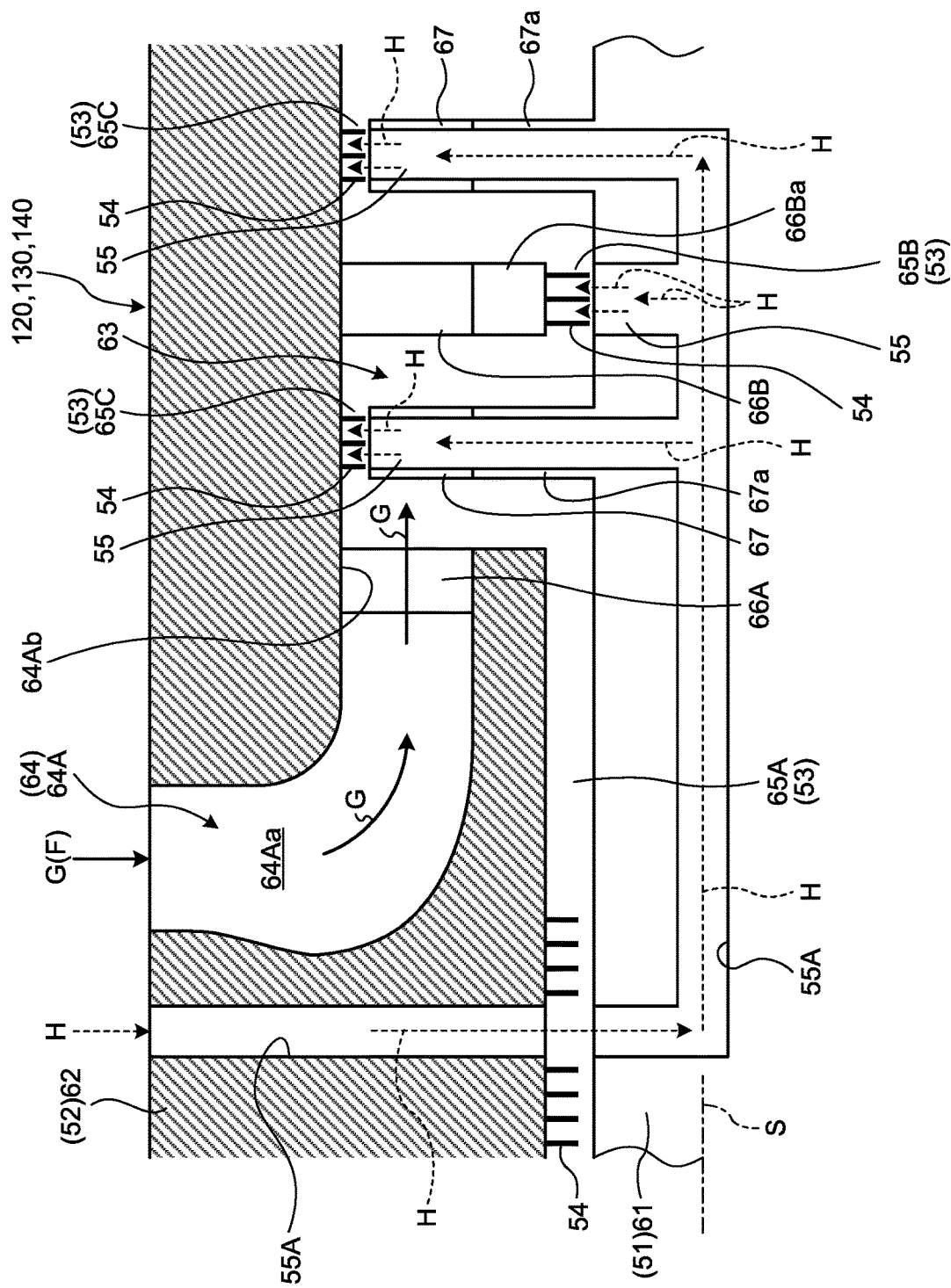

SEALING DEVICE

FIELD

The present invention relates to a sealing device that prevents a fluid from leaking between a stationary body and a rotating body.

BACKGROUND

Typically, as a sealing device that prevents a fluid from leaking between a stationary body and a rotating body, there is known a configuration of arranging a fin that extends from at least one of the stationary body and the rotating body and is not in contact with the other one thereof. When the fin is brought into contact with the other one of the stationary body and the rotating body, there is always a gap due to generated heat or vibration, so that the fluid leaks from this gap.

In the related art, a shape of the fin has been devised to prevent the fluid from leaking in such a sealing device and improve sealing performance (for example, refer to Japanese Patent Application Laid-open No. 2008-196522 and Japanese Patent Application Laid-open No. 2013-019537).

However, even if the shape of the fin has been devised, there is a limit to improvement in the sealing performance, and the sealing performance is desired to be further improved.

SUMMARY OF THE INVENTION

The present invention has been made to solve the problem described above and provides a sealing device that can improve the sealing performance.

Solution to Problem

To achieve the object described above, a sealing device of a first invention includes a fin extending from a stationary body toward a rotating body in a gap between the stationary body and the rotating body, the fin being not in contact with the rotating body; a through hole formed to be opened in at least one of the stationary body and the rotating body on an upstream side of the fin in a flow direction of a fluid to flow into the gap between the stationary body and the rotating body, the through hole being opened toward an upstream side of the fluid to flow in the gap between the stationary body and the rotating body; and a high pressure fluid supplying unit configured to supply a high pressure fluid to the gap from the through hole, the high pressure fluid having a higher pressure than the fluid to flow into the gap between the stationary body and the rotating body.

With this sealing device, in a form in which the through hole is opened in the stationary body, when the high pressure fluid supplied from the high pressure fluid supplying unit is ejected to the upstream side of the fluid flow direction from the through hole to the fin, a flow rate of the fluid is reduced corresponding to a flow rate of the high pressure fluid, and the fluid is prevented from passing through between a distal end of the fin and the rotating body. As a result, sealing performance can be improved. In a form in which the through hole is opened in the rotating body, when the high pressure fluid supplied from the high pressure fluid supplying unit is ejected to the upstream side of the fluid flow direction from the through hole to the fin, the high pressure fluid functions to push the fluid aside on the upstream side of the fluid flow direction at the fin and prevents the fluid from passing through between the distal end of the fin and the rotating body. As a result, the sealing performance can be improved.

Additionally, with this sealing device, in a form in which the through hole is opened in the stationary body, the high pressure fluid ejected from the through hole boosts a vortex to be stronger, the vortex being generated when the fluid collides with the fin on the upstream side of the fluid flow direction at the fin, and the fluid is prevented from passing through between the distal end of the fin and the rotating body. As a result, the sealing performance can be improved. In a form in which the through hole is opened in the rotating body, the high pressure fluid ejected from the through hole boosts the vortex to be stronger, the vortex being generated when the fluid collides with the fin on the upstream side of the fluid flow direction at the fin, and the high pressure fluid functions to push the fluid aside on the upstream side of the fluid flow direction at the fin to prevent the fluid from passing through between the distal end of the fin and the rotating body. As a result, the sealing performance can be improved.

In the sealing device of a second invention according to the first invention, it is preferable that a plurality of the fins are arranged in the flow direction of the fluid, and the through hole is arranged on an upstream side of the flow direction of the fluid with respect to each of the fins. Accordingly, with the sealing device according to the second aspect, the flow rate of the fluid is reduced corresponding to the flow rate of the high pressure fluid on the upstream side of the fluid flow direction at each fin, and the fluid is prevented from passing through between the distal end of the fin and the rotating body, so that the sealing performance can be further improved.

The sealing device of a third invention according to the first invention or the second invention is applied to a rotary machine. The rotary machine includes a rotor extending along a rotational axis of the rotor, the rotor serving as the rotating body, a casing for storing the rotor, a fluid passage provided between the rotor and the casing along an extending direction of the rotor, and a fluid nozzle unit having an annular shape that surrounds an outer circumference of the rotor, the fluid nozzle unit being attached to the casing with a gap communicating with the fluid passage between an outer face of the fluid nozzle unit and an outer peripheral surface of the rotor, the fluid nozzle unit including a fluid nozzle chamber to which a superheated fluid being supplied and which is formed inside the fluid nozzle unit in an annular shape and an opening communicating with the fluid passage from the fluid nozzle chamber toward the extending direction of the rotor, the fluid nozzle unit serving as the stationary body. The fin is arranged in the gap extending from the fluid nozzle unit toward the rotor. The through hole is arranged to be opened toward the rotor in the fluid nozzle unit. The high pressure fluid supplying unit supplies, to the rotary machine, a high pressure fluid having a higher pressure and a lower temperature than the fluid that is supplied to the rotary machine to flow into the gap.

With this sealing device, the high pressure fluid having a higher pressure and a lower temperature than those of the fluid supplied to the rotary machine is ejected to a gap between the fluid nozzle unit and an outer peripheral surface of the rotor, so that the sealing performance in the gap can be improved, and the fluid supplied to the rotary machine can be prevented from leaking out. Additionally, the high pressure fluid having a higher pressure and a lower temperature than those of the fluid supplied to the rotary machine is ejected to the gap between the fluid nozzle unit and the outer peripheral surface of the rotor, so that the rotor can be cooled. As a result, operation efficiency of the rotary machine can be improved.

The sealing device of a fourth invention according to the first invention or the second invention is applied to a rotary machine. The rotary machine includes a rotor extending along a rotational axis of the rotor, the rotor serving as the rotating body, a casing for storing the rotor, a fluid passage provided between the rotor and the casing along an extending direction of the rotor, and a fluid nozzle unit having an annular shape that surrounds an outer circumference of the rotor, the fluid nozzle unit being attached to the casing with a gap communicating with the fluid passage between an outer face of the fluid nozzle unit and an outer peripheral surface of the rotor, the fluid nozzle unit including a fluid nozzle chamber to which a superheated fluid being supplied and which is formed inside the fluid nozzle unit in an annular shape and an opening communicating with the fluid passage from the fluid nozzle chamber toward the extending direction of the rotor, the fluid nozzle unit serving as the stationary body. The fin is arranged in the gap extending from the fluid nozzle unit toward the rotor. The through hole is arranged to be opened toward the fluid nozzle unit in the rotor. The high pressure fluid supplying unit supplies, to the rotary machine, a high pressure fluid having a higher pressure and a lower temperature than the fluid that is supplied to the rotary machine to flow into the gap.

With this sealing device, the high pressure fluid having a higher pressure and a lower temperature than those of the fluid supplied to the rotary machine is ejected to the gap between the fluid nozzle unit and the outer peripheral surface of the rotor, so that the sealing performance in the gap can be improved, and the fluid supplied to the rotary machine can be prevented from leaking out. Additionally, the high pressure fluid having a higher pressure and a lower temperature than those of the fluid supplied to the rotary machine is ejected to the gap between the fluid nozzle unit and the outer peripheral surface of the rotor, so that the rotor can be cooled. As a result, the operation efficiency of the rotary machine can be improved.

The sealing device of a fifth invention according to the first invention or the second invention is applied to a rotary machine. The rotary machine includes a rotor extending along a rotational axis of the rotor, the rotor serving as the rotating body, a casing for storing the rotor, the casing serving as the stationary body, a fluid passage arranged between the rotor and the casing along an extending direction of the rotor, a stator vane extending from the casing in the fluid passage with a gap communicating with the fluid passage between the stator vane and an outer peripheral surface of the rotor, the stator vane serving as the stationary body, and a rotor blade extending from the rotor in the fluid passage with a gap communicating with the fluid passage between the rotor blade and the casing, the rotor blade serving as the rotating body. The fin is arranged in each gap. The through hole is arranged in the casing and the stator vane. The high pressure fluid supplying unit supplies, to the rotary machine, a high pressure fluid having a higher pressure and a lower temperature than the fluid that is supplied to the rotary machine to flow into the gap.

With this sealing device, the high pressure fluid having a higher pressure and a lower temperature than those of the fluid supplied to the rotary machine is ejected to the gap between the stator vane and the outer peripheral surface of the rotor, so that the sealing performance in the gap can be improved, and the fluid supplied to the rotary machine can be prevented from leaking out. Additionally, the high pressure fluid having a higher pressure and a lower temperature than those of the fluid supplied to the rotary machine is ejected to the gap between the stator vane and the outer peripheral surface of the rotor, so that the rotor can be cooled. As a result, the operation efficiency of the rotary machine can be improved. With this sealing device, the high pressure fluid having a higher pressure and a lower temperature than those of the fluid supplied to the rotary machine is ejected to the gap between the casing and the rotor blade, so that the sealing performance in the gap can be improved, and the fluid supplied to the rotary machine can be prevented from leaking out. Additionally, the high pressure fluid having a higher pressure and a lower temperature than those of the fluid supplied to the rotary machine is ejected to the gap between the casing and the rotor blade, so that the rotor blade can be cooled. As a result, the operation efficiency of the rotary machine can be improved.

The sealing device of a sixth invention according to the first invention or the second invention is applied to a rotary machine. The rotary machine includes a rotor extending along a rotational axis of the rotor, the rotor serving as the rotating body, a casing for storing the rotor, the casing serving as the stationary body, a fluid passage arranged between the rotor and the casing along an extending direction of the rotor, a stator vane extending from the casing in the fluid passage with a gap communicating with the fluid passage between the stator vane and an outer peripheral surface of the rotor, the stator vane serving as the stationary body, and a rotor blade extending from the rotor in the fluid passage with a gap communicating with the fluid passage between the rotor blade and the casing, the rotor blade serving as the rotating body. The fin is arranged in each gap. The through hole is arranged in the rotor and the rotor blade. The high pressure fluid supplying unit supplies, to the rotary machine, a high pressure fluid having a higher pressure and a lower temperature than the fluid that is supplied to the rotary machine to flow into the gap With this sealing device, the high pressure fluid having a higher pressure and a lower temperature than those of the fluid supplied to the rotary machine is ejected to the gap between the stator vane and the outer peripheral surface of the rotor, so that the sealing performance in the gap can be improved, and the fluid supplied to the rotary machine can be prevented from leaking out. Additionally, the high pressure fluid having a higher pressure and a lower temperature than those of the fluid supplied to the rotary machine is ejected to the gap between the stator vane and the outer peripheral surface of the rotor, so that the rotor can be cooled. As a result, the operation efficiency of the rotary machine can be improved. With this sealing device, the high pressure fluid having a higher pressure and a lower temperature than those of the fluid supplied to the rotary machine is ejected to the gap between the casing and the rotor blade, so that the sealing performance in the gap can be improved, and the fluid supplied to the rotary machine can be prevented from leaking out. Additionally, the high pressure fluid having a higher pressure and a lower temperature than those of the fluid supplied to the rotary machine is ejected to the gap between the casing and the rotor blade, so that the rotor blade can be cooled. As a result, the operation efficiency of the rotary machine can be improved.

The sealing device of a seventh invention according to the sixth invention is applied to a rotary machine. The rotary machine includes a fluid nozzle unit having an annular shape that surrounds an outer circumference of the rotor, the fluid nozzle unit being attached to the casing with a gap communicating with the fluid passage between an outer face of the fluid nozzle unit and an outer peripheral surface of the rotor, the fluid nozzle unit including a fluid nozzle chamber to which a superheated fluid being supplied and which is formed inside the fluid nozzle unit in an annular shape and an opening communicating with the fluid passage from the fluid nozzle chamber toward the extending direction of the rotor, the fluid nozzle unit serving as the stationary body. The sealing device includes a supply hole that is once opened to the gap between the fluid nozzle unit and an outer peripheral surface of the rotor, and communicates with the through hole via the rotor; and a fin extending from the fluid nozzle unit toward the rotor around a part where the supply hole is once opened to the gap between the fluid nozzle unit and the outer peripheral surface of the rotor.

With this sealing device, the supply hole is opened once in the gap between the fluid nozzle unit and the rotor, and the fin is arranged in the gap to extend from the fluid nozzle unit toward the rotor around the opened supply hole, so that the fluid supplied to the rotary machine can be prevented from leaking out in the gap between the fluid nozzle unit and the rotor.

Advantageous Effects of Invention

According to the present invention, the sealing performance can be improved.

BRIEF DESCRIPTION OF DRAWINGS

FIG. 10 is a schematic configuration diagram illustrating an example of the sealing device according to the embodiment of the present invention.

DESCRIPTION OF EMBODIMENTS

The following describes an embodiment according to the present invention in detail based on the drawings. The present invention is not limited to the embodiment. Components in the following embodiment include a component that is replaceable and easily conceivable by those skilled in the art, and substantially the same component.

Figure 1:
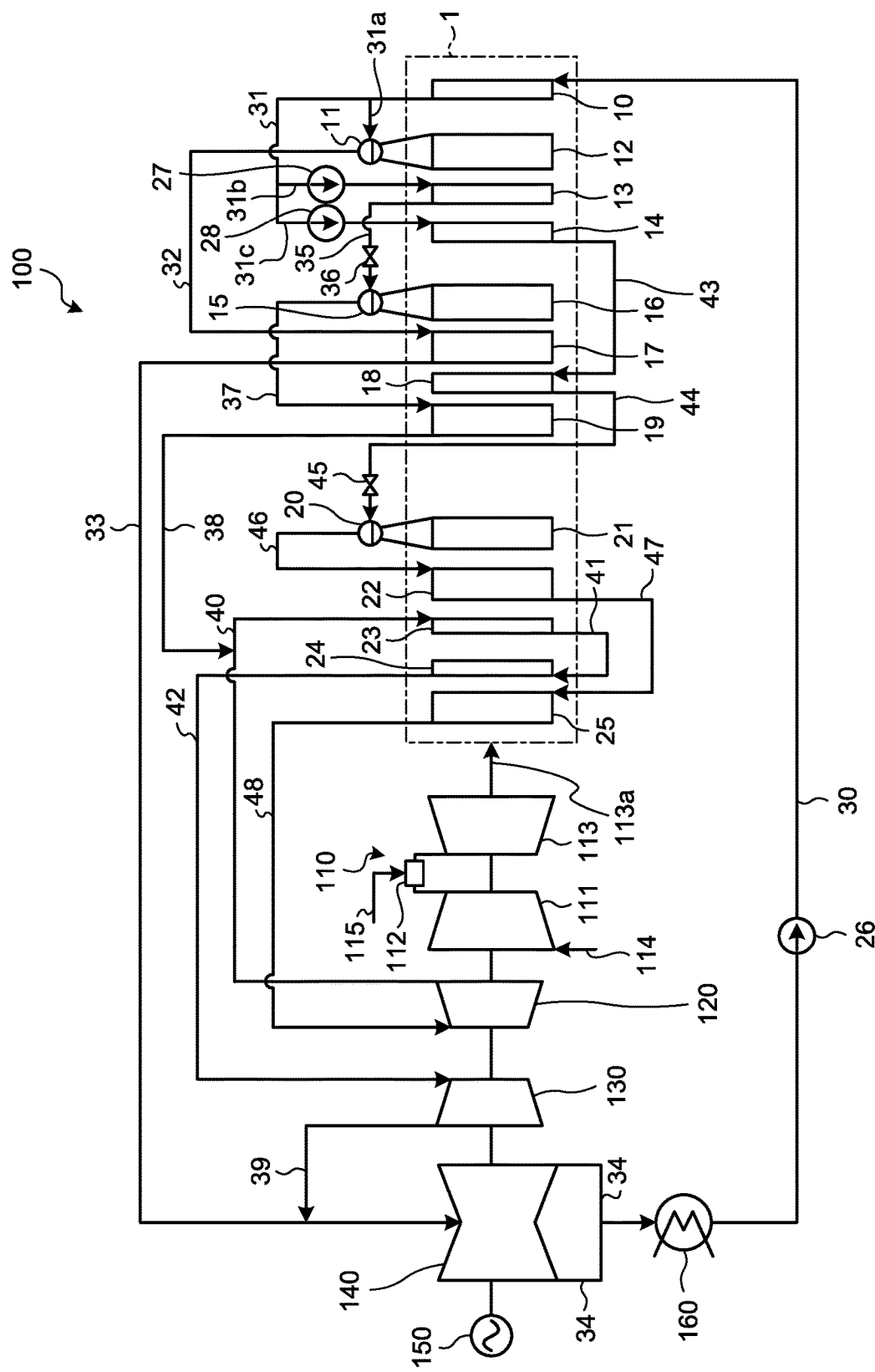
FIG. 1 is a schematic configuration diagram illustrating an example of a combined cycle plant.

A sealing device according to the present embodiment is applied to, for example, a gas turbine and a steam turbine as a rotary machine. FIG. 1 is a schematic configuration diagram illustrating an example of a combined cycle plant to which such a gas turbine and a steam turbine are applied. A combined cycle plant 100 illustrated in FIG. 1 includes a gas turbine 110, a high pressure steam turbine 120, a medium pressure steam turbine 130, and a low pressure steam turbine 140. The gas turbine 110, the high pressure steam turbine 120, the medium pressure steam turbine 130, and the low pressure steam turbine 140 are arranged coaxially with a power generator 150.

The gas turbine 110 includes a compressor 111, a burner 112, and a turbine 113. Compressor inlet air 114 is boosted in the compressor 111 and supplied to the burner 112. In the burner 112, high-temperature combustion gas is generated by the supplied air and fuel 115 to be supplied to the turbine 113. The combustion gas passing through the turbine 113 rotates and drives the turbine 113, and is discharged as flue gas.

The combined cycle plant 100 includes a boiler (exhausted heat recovery boiler) 1 that generates superheated steam from water using the flue gas discharged from the turbine 113 of the gas turbine 110 as a heating source. With the superheated steam generated by the boiler 1, the high pressure steam turbine 120, the medium pressure steam turbine 130, and the low pressure steam turbine 140 are driven. When the gas turbine 110, the high pressure steam turbine 120, the medium pressure steam turbine 130, and the low pressure steam turbine 140 are driven, electricity is generated by the power generator 150. Steam used in the low pressure steam turbine 140 is condensed by a condenser 160 connected to the low pressure steam turbine 140, and sent to the boiler 1 as water for generating superheated steam.

The boiler 1 is connected to a flue gas duct 113a arranged on an exhaust side of the turbine 113 of the gas turbine 110. The boiler 1 includes, from a downstream side of a flow of flue gas, a low pressure economizer 10, a low pressure drum 11, a low pressure evaporator 12, a medium pressure economizer 13, a high pressure primary economizer 14, a medium pressure drum 15, a medium pressure evaporator 16, a low pressure superheater 17, a high pressure secondary economizer 18, a medium pressure superheater 19, a high pressure drum 20, a high pressure evaporator 21, a high pressure primary superheater 22, a primary reheater 23, a secondary reheater 24, and a high pressure secondary superheater 25 arranged therein, and includes a condensate pump 26, a medium pressure water supply pump 27, and a high pressure water supply pump 28 arranged therein.

The boiler 1 includes a low pressure system that generates low-pressure superheated steam for driving the low pressure steam turbine 140, a medium pressure system that generates medium-pressure superheated steam for driving the medium pressure steam turbine 130, and a high pressure system that generates high-pressure superheated steam for driving the high pressure steam turbine 120. The low pressure system includes the low pressure economizer 10, the low pressure drum 11, the low pressure evaporator 12, the low pressure superheater 17, and the condensate pump 26. The medium pressure system includes the medium pressure economizer 13, the medium pressure drum 15, the medium pressure evaporator 16, the medium pressure superheater 19, the primary reheater 23, the secondary reheater 24, and the medium pressure water supply pump 27. The high pressure system includes the high pressure primary economizer 14, the high pressure secondary economizer 18, the high pressure drum 20, the high pressure evaporator 21, the high pressure primary superheater 22, the high pressure secondary superheater 25, and the high pressure water supply pump 28.

In the low pressure system, the low pressure economizer 10 is connected to the condenser 160 via a connection line 30. The condensate pump 26 is arranged in the connection line 30. The low pressure economizer 10 is connected to the low pressure drum 11 via a low pressure branch line 31a of a connection line 31 branching into three lines. The low pressure drum 11 is connected to the low pressure evaporator 12. The low pressure drum 11 is connected to the low pressure superheater 17 via a connection line 32. The low pressure superheater 17 is connected to an inlet side of the low pressure steam turbine 140 via a connection line 33. An outlet side of the low pressure steam turbine 140 is connected to the condenser 160 via a connection line 34.

That is, in the low pressure system, water (condensed water) of the condenser 160 flows into the low pressure economizer 10 to be heated via the connection line 30 through the condensate pump 26, and flows into the low pressure drum 11 via the low pressure branch line 31a of the connection line 31. The water supplied to the low pressure drum 11 is evaporated by the low pressure evaporator 12 to be a saturated vapor to be returned to the low pressure drum 11, and is sent out to the low pressure superheater 17 via the connection line 32. The saturated vapor is superheated by the low pressure superheater 17, and the superheated steam is supplied to the low pressure steam turbine 140 via the connection line 33. The steam discharged by driving the low pressure steam turbine 140 is guided to the condenser 160 via the connection line 34 to be water (condensed water), and sent out to the low pressure economizer 10 by the condensate pump 26 via the connection line 30.

In the medium pressure system, the medium pressure economizer 13 is connected to the low pressure economizer 10 via a medium pressure branch line 31b of the connection line 31 branching into three lines. The medium pressure water supply pump 27 is arranged in the medium pressure branch line 31b. The medium pressure economizer 13 is connected to the medium pressure drum 15 via a connection line 35. A flow rate regulating valve 36 is arranged in the connection line 35. The medium pressure drum 15 is connected to the medium pressure evaporator 16. The medium pressure drum 15 is connected to the medium pressure superheater 19 via a connection line 37. The medium pressure superheater 19 is connected to an inlet side of the primary reheater 23 via a connection line 38. In the medium pressure system, the primary reheater 23 is connected to an outlet side of the high pressure steam turbine 120 via a connection line 40. The primary reheater 23 is connected to the secondary reheater 24 via a connection line 41. The secondary reheater 24 is connected to an inlet side of the medium pressure steam turbine 130 via a connection line 42. An outlet side of the medium pressure steam turbine 130 is connected to an inlet side of the low pressure steam turbine 140 via a connection line 39.

That is, in the medium pressure system, water heated by the low pressure economizer 10 is caused to flow into the medium pressure economizer 13 by the medium pressure water supply pump 27 via the medium pressure branch line 31b of the connection line 31 to be further heated, and flows into the medium pressure drum 15 via the connection line 35. The water supplied to the medium pressure drum 15 is evaporated by the medium pressure evaporator 16 to be a saturated vapor to be returned to the medium pressure drum 15, and sent out to the medium pressure superheater 19 via the connection line 37. The saturated vapor is superheated by the medium pressure superheater 19, and the superheated steam is supplied to the primary reheater 23 via the connection line 38. In the medium pressure system, the steam discharged by driving the high pressure steam turbine 120 is sent out to the primary reheater 23 via the connection line 40. The steam is superheated by the primary reheater 23, and the superheated steam is sent out to the secondary reheater 24 via the connection line 41. The steam is further superheated by the secondary reheater 24, and the superheated steam is supplied to the medium pressure steam turbine 130 via the connection line 42. The steam discharged by driving the medium pressure steam turbine 130 is supplied to the low pressure steam turbine 140 via the connection line 39.

The primary reheater 23 and the secondary reheater 24 superheat the steam, so that the primary reheater 23 and the secondary reheater 24 have a function similar to that of the superheater and are included in the superheater in the present embodiment. That is, the primary reheater 23 may also be called a first superheater, and the secondary reheater 24 may also be called a second superheater.

In the high pressure system, the high pressure primary economizer 14 is connected to the low pressure economizer 10 via a high pressure branch line 31c of the connection line 31 branching into three lines. The high pressure water supply pump 28 is arranged in the high pressure branch line 31c. The high pressure primary economizer 14 is connected to the high pressure secondary economizer 18 via a connection line 43. The high pressure secondary economizer 18 is connected to the high pressure drum 20 via a connection line 44. A flow rate regulating valve 45 is arranged in the connection line 44. The high pressure drum 20 is connected to the high pressure evaporator 21. The high pressure drum 20 is connected to the high pressure primary superheater 22 via a connection line 46. The high pressure primary superheater 22 is connected to the high pressure secondary superheater 25 via a connection line 47. The high pressure secondary superheater 25 is connected to an inlet side of the high pressure steam turbine 120 via a connection line 48. An outlet side of the high pressure steam turbine 120 is connected to the primary reheater 23 of the medium pressure system via the connection line 40 as described above.

That is, in the high pressure system, the water heated by the low pressure economizer 10 is caused to flow into the high pressure primary economizer 14 to be further heated by the high pressure water supply pump 28 via the high pressure branch line 31c of the connection line 31, flows into the high pressure secondary economizer 18 via the connection line 43 to be further heated, and flows into the high pressure drum 20 via the connection line 44. The water supplied to the high pressure drum 20 is evaporated by the high pressure evaporator 21 to be a saturated vapor to be returned to the high pressure drum 20, and sent out to the high pressure primary superheater 22 via the connection line 46. The saturated vapor is superheated by the high pressure primary superheater 22, and the superheated steam is sent out to the high pressure secondary superheater 25 via the connection line 47. The superheated steam is further superheated by the high pressure secondary superheater 25, and the superheated steam is supplied to the high pressure steam turbine 120 via the connection line 48.

The gas turbine 110 and the steam turbines 120, 130, and 140 applied to the combined cycle plant 100 all include a rotating body and a stationary body. Examples of the rotating body include a rotor, and a rotor blade attached to the rotor. Examples of the stationary body include a casing that stores the rotating body such as a rotor and a rotor blade, and a stator vane attached to the casing. A gap is required between the rotating body and the stationary body to allow rotation of the rotating body with respect to the stationary body, and a sealing device according to the present embodiment is arranged to prevent the fluid from leaking out through the gap.

FIGS. 2 to 10 are schematic configuration diagrams illustrating examples of the sealing device according to the present embodiment. FIGS. 2 to 5 illustrate examples of main configuration of the sealing device according to the present embodiment.

As illustrated in FIGS. 2 to 5, the sealing device according to the present embodiment is applied to a gap 53 between a rotating body 51 and a stationary body 52. In the rotary machine described above, a flow direction of a fluid F is determined, the fluid F being able to flow into the gap 53 due to a function of the rotary machine. For example, in the gas turbine 110, the compressor 111 compresses the fluid (air) F along an extending direction of the rotor, and a pressure of the fluid F is increased from a preceding stage of compression to a succeeding stage, so that the fluid F flows to the gap 53 from the succeeding stage of compression toward the preceding stage. In the gas turbine 110, a high-temperature and high-pressure fluid (combustion gas) F generated by the burner 112 is sent to the turbine 113 along the extending direction of the rotor, and the pressure of the fluid F is reduced from a preceding stage of sending toward a succeeding stage thereof, so that the fluid F flows into the gap 53 from the preceding stage of sending toward the succeeding stage thereof. For example, in the steam turbines 120, 130, and 140, high-temperature fluid (steam) F is sent along the extending direction of the rotor, and the pressure of the fluid F is reduced from the preceding stage of sending toward the succeeding stage thereof, so that the fluid F flows into the gap 53 from the preceding stage of sending toward the succeeding stage thereof.

The sealing device according to the present embodiment includes a fin 54, a through hole 55, and a high pressure fluid supplying unit 56 as illustrated in FIGS. 2 to 5.

The fin 54 is arranged in the gap 53 between the stationary body 52 and the rotating body 51 to extend from the stationary body 52 toward the rotating body 51, not being in contact with the rotating body 51. A single fin 54 may be arranged, but a plurality of fins 54 may be arranged along the flow direction of the fluid F to inhibit the fluid F from flowing in the gap 53. For example, the fin 54 may be applied to a labyrinth seal, a brush seal, and a leaf seal.

Figure 2:
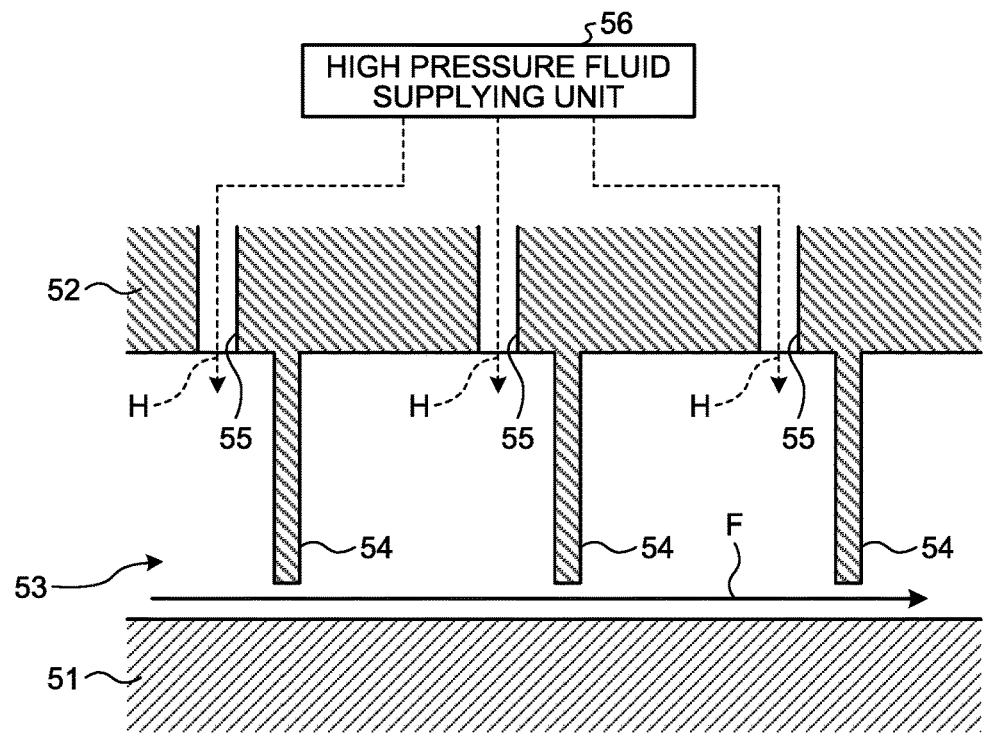
FIG. 2 is a schematic configuration diagram illustrating an example of a sealing device according to an embodiment of the present invention.
Figure 3:
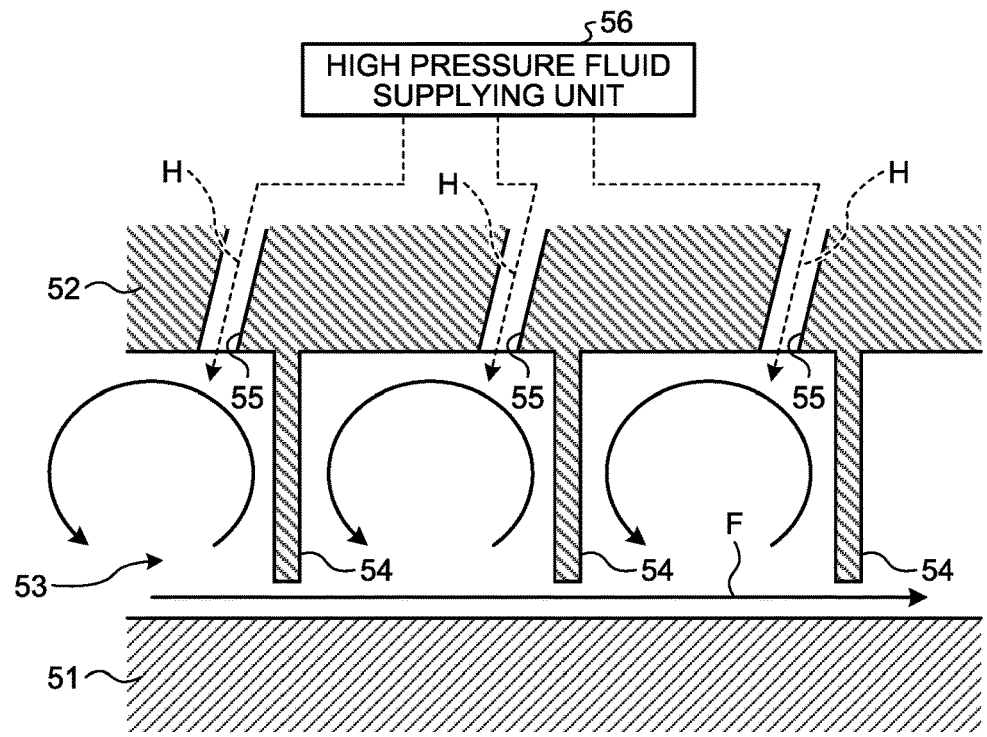
FIG. 3 is a schematic configuration diagram illustrating an example of the sealing device according to the embodiment of the present invention.
Figure 4:
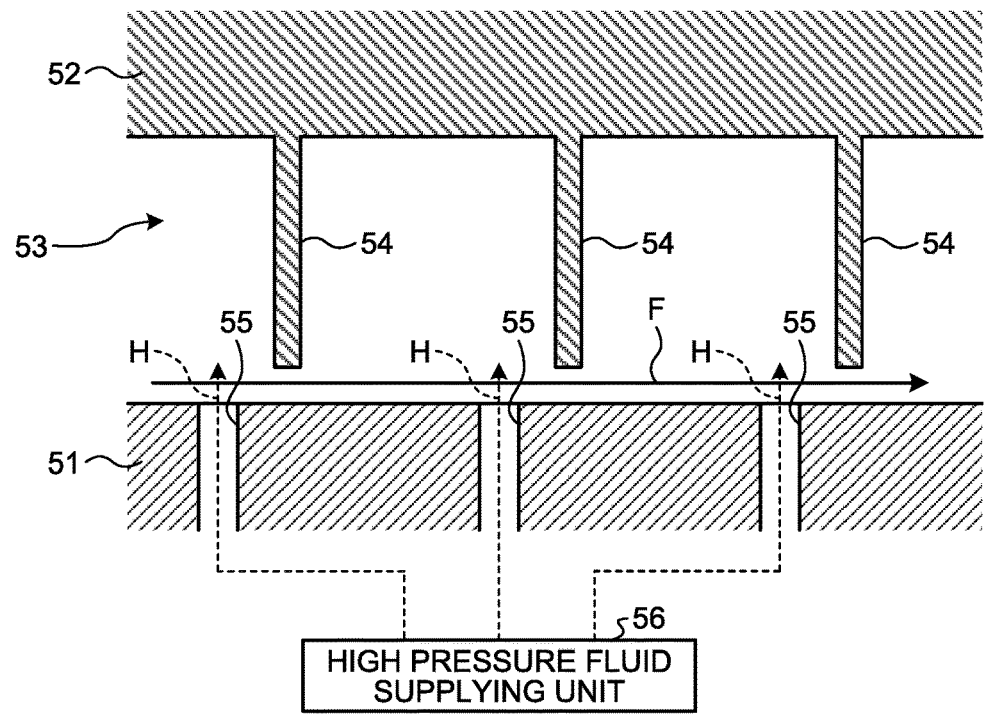
FIG. 4 is a schematic configuration diagram illustrating an example of the sealing device according to the embodiment of the present invention.
Figure 5:
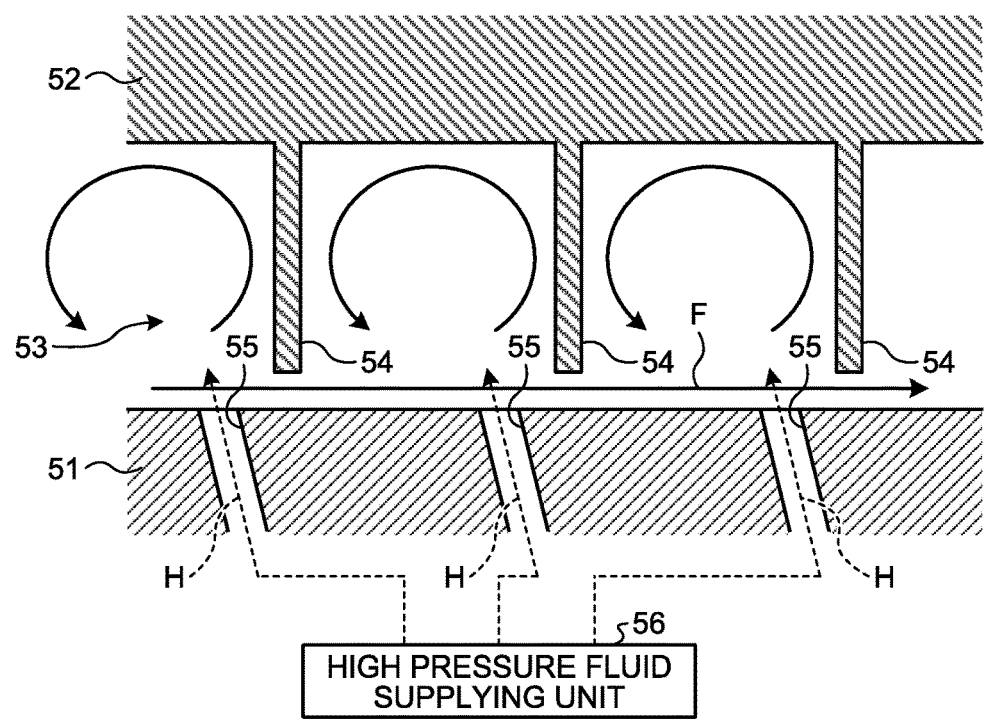
FIG. 5 is a schematic configuration diagram illustrating an example of the sealing device according to the embodiment of the present invention.

The through hole 55 is formed to be opened in at least one of the stationary body 52 and the rotating body 51 on the upstream side of the fin 54 with respect to the flow direction of the fluid F that can flow into the gap 53 between the stationary body 52 and the rotating body 51. FIGS. 2 and 3 illustrate a form in which the through hole 55 is formed to be opened in the stationary body 52. FIGS. 4 and 5 illustrate a form in which the through hole 55 is formed to be opened in the rotating body 51. Although not clearly illustrated in the drawing, the through hole 55 may be formed to be opened in the stationary body 52 and the rotating body 51. In a case in which a plurality of fins 54 are arranged along the flow direction of the fluid F, through holes 55 may be arranged on the upstream side of the flow direction of the fluid F with respect to the respective fins 54, but the through hole 55 may be at least arranged on the upstream side of the flow direction of the fluid F with respect to the fin 54 arranged on the most upstream side of the flow direction of the fluid F.

The high pressure fluid supplying unit 56 supplies a high pressure fluid H having a higher pressure than that of the fluid F that can flow into the gap 53 between the stationary body 52 and the rotating body 51 to the gap 53 from the through hole 55. Thus, the high pressure fluid supplying unit 56 includes a source of supply that generates the high pressure fluid H having a higher pressure than that of the fluid F, and piping that sends the high pressure fluid H from the source of supply to the through hole 55.

With such a sealing device, as illustrated in FIGS. 2 and 3, in a form in which the through hole 55 is formed to be opened in the stationary body 52, when the high pressure fluid H supplied from the high pressure fluid supplying unit 56 is ejected to the upstream side of the flow direction of the fluid F at the fin 54 from the through hole 55, the flow rate of the fluid F is reduced corresponding to the flow rate of the high pressure fluid H, and the fluid F is prevented from passing through between the distal end of the fin 54 and the rotating body 51. As a result, sealing performance can be improved.

As illustrated in FIGS. 4 and 5, in a form in which the through hole 55 is opened in the rotating body 51, when the high pressure fluid H supplied from the high pressure fluid supplying unit 56 is ejected to the upstream side of the flow direction of the fluid F at the fin 54 from the through hole 55, the high pressure fluid H functions to push the fluid F aside on the upstream side of the flow direction of the fluid F at the fin 54, and the fluid F is prevented from passing through between the distal end of the fin 54 and the rotating body 51. As a result, the sealing performance can be improved.

In the sealing device according to the present embodiment, as illustrated in FIGS. 3 and 5, the through hole 55 is preferably arranged to be opened toward the upstream side of the fluid F that can flow in the gap 53 between the stationary body 52 and the rotating body 51.

In the sealing device, as illustrated in FIG. 3, in a form in which the through hole 55 is formed to be opened in the stationary body 52, the high pressure fluid H ejected from the through hole 55 boosts a vortex to be stronger, the vortex being generated when the fluid F collides with the fin 54 on the upstream side of the flow direction of the fluid F at the fin 54, and the fluid F is prevented from passing through between the distal end of the fin 54 and the rotating body 51. As a result, the sealing performance can be improved.

As illustrated in FIG. 5, in a form in which the through hole 55 is formed to be opened in the rotating body 51, the high pressure fluid H ejected from the through hole 55 boosts the vortex to be stronger, the vortex being generated when the fluid F collides with the fin 54 on the upstream side of the flow direction of the fluid F at the fin 54, the high pressure fluid H functions to push the fluid F aside on the upstream side of the flow direction of the fluid F at the fin 54, and the fluid F is prevented from passing through between the distal end of the fin 54 and the rotating body 51. As a result, the sealing performance can be improved.

FIGS. 6 to 10 illustrate application examples of the sealing device illustrated in FIGS. 2 to 5, and illustrate examples of applying the sealing device to the steam turbines 120, 130, and 140 described above.

As illustrated in FIGS. 6 to 10, the steam turbines 120, 130, and 140 include a rotor 61, a casing 62, a steam passage (fluid passage) 63, and a steam supplying unit (fluid supplying unit) 64. The rotor 61 is arranged to extend along a rotational axis S of itself. The casing 62 stores the rotor 61, and supports the rotor 61 to be rotatable about the axis S. The steam passage 63 is an annular space arranged between the rotor 61 and the casing 62 along the extending direction of the rotor 61. The steam supplying unit 64 is arranged from the outside of the casing 62 to communicate with the steam passage 63 while passing through the casing 62, and when superheated steam G (corresponding to the fluid F) that has been superheated is supplied, the steam supplying unit 64 supplies the steam to the steam passage 63.

The steam supplying unit 64 includes a steam nozzle unit (fluid nozzle unit) 64A. The steam nozzle unit 64A has an annular shape which surrounds an outer circumference of the rotor 61, and is attached to the casing 62 with a gap 65A communicating with the steam passage 63 between an outer face of the steam nozzle unit 64A and an outer peripheral surface of the rotor 61. The steam nozzle unit 64A includes a steam nozzle chamber (fluid nozzle chamber) 64Aa formed inside the steam nozzle unit 64A in an annular shape, and an opening 64Ab opened from the steam nozzle chamber 64Aa toward the extending direction of the rotor 61 to communicate with the steam passage 63. The superheated steam G that has been superheated is supplied to the steam nozzle unit 64A, and ejected from the opening 64Ab to the steam passage 63. In a case of the high pressure steam turbine 120, the steam supplying unit 64 is connected to the connection line 48 illustrated in FIG. 1, and the superheated steam G that has been superheated by the high pressure secondary superheater 25 is supplied thereto. In a case of the medium pressure steam turbine 130, the steam supplying unit 64 is connected to the connection line 42 illustrated in FIG. 1, and the superheated steam G that has been superheated by the secondary repeater 24 is supplied thereto. In a case of the low pressure steam turbine 140, the steam supplying unit 64 is connected to the connection line 33 illustrated in FIG. 1, and the superheated steam G that has been superheated by the low pressure superheater 17 is supplied thereto.

In the steam supplying unit 64, a plurality of nozzle unit stator vanes 66A are attached annularly along the opening 64Ab of the steam nozzle chamber 64Aa in the steam nozzle unit 64A. The rotor 61 side of the nozzle unit stator vane 66A is a distal end part, and the casing 62 side thereof is a base end part. In the steam passage 63, a plurality of steam passage stator vanes 66B are attached annularly along the casing 62. A plurality of stages of steam passage stator vanes 66B are arranged along the extending direction of the rotor 61. The rotor 61 side of the steam passage stator vane 66B is a distal end part to which an annular member 66Ba is attached, a gap 65B is present between the annular member 66Ba and the outer peripheral surface of the rotor 61, and a side attached to the casing 62 is a base end part. In the steam passage 63, a plurality of rotor blades 67 are attached annularly along the outer circumference of the rotor 61 being adjacent to the stator vanes 66A and 66B. A plurality of stages of rotor blades 67 are arranged along the extending direction of the rotor 61. A side attached to the rotor 61 of the rotor blade 67 is a base end part, and an annular member 67a is attached between the rotor blade 67 and the rotor 61. A side facing the casing 62 of the rotor blade 67 is a distal end part, and there is a gap 65C between the rotor blade 67 and the casing 62.

Thus, the superheated steam G superheated by the steam nozzle chamber 64Aa is supplied to the steam turbines 120, 130, and 140, the superheated steam G is ejected to the steam passage 63 from the opening 64Ab, and the rotor 61 is rotated by the stator vanes 66A and 66B and the rotor blade 67.

Figure 6:
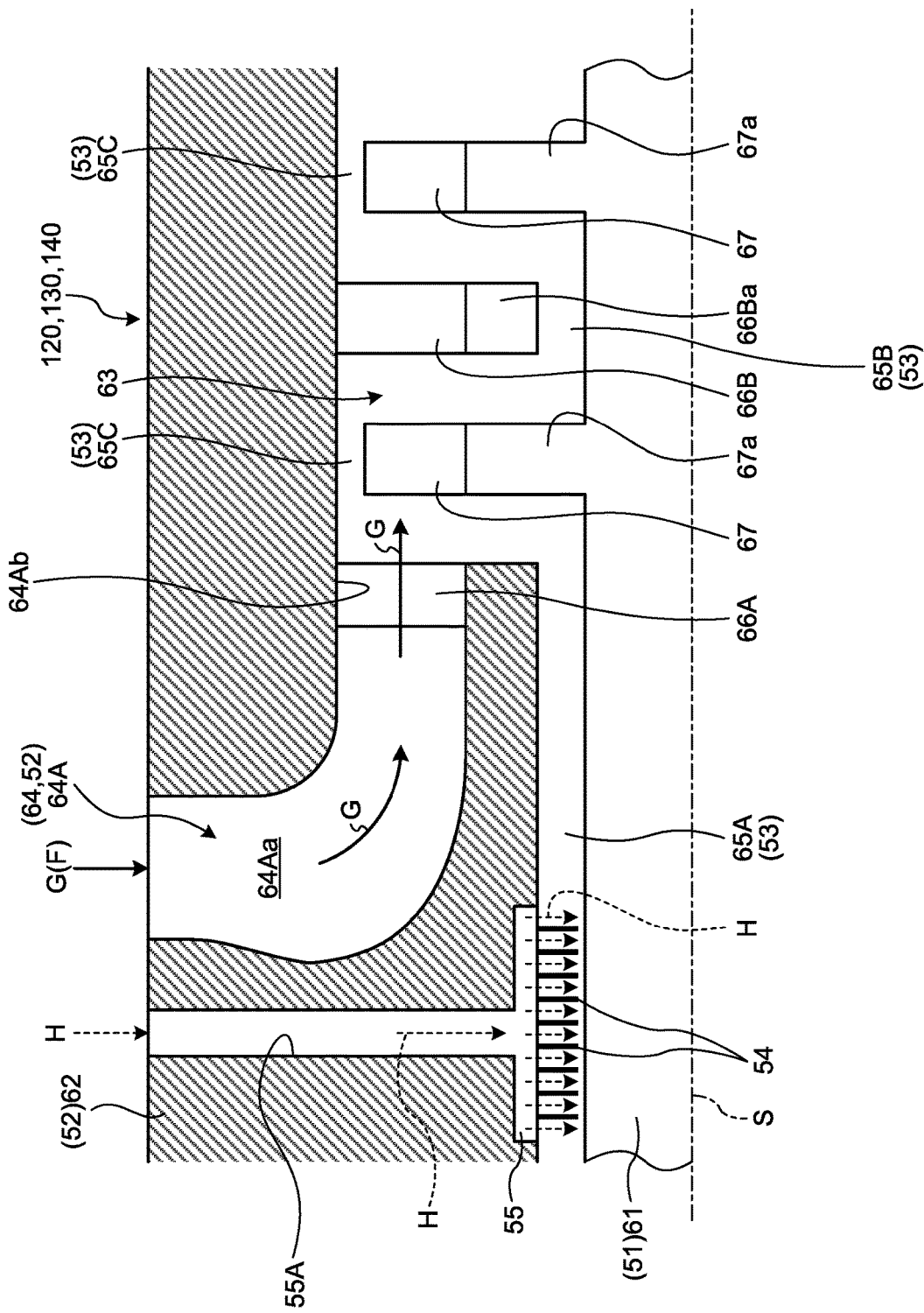
FIG. 6 is a schematic configuration diagram illustrating an example of the sealing device according to the embodiment of the present invention.

In the sealing device illustrated in FIG. 6, for the steam turbines 120, 130, and 140, the fin 54 is arranged in the gap 65A extending from the steam nozzle unit 64A toward the rotor 61, and the through hole 55 is arranged to be opened toward the rotor 61 in the steam nozzle unit 64A. The through hole 55 communicates with a supply hole 55A passing through the casing 62 from the outside of the casing 62, and the high pressure fluid H is supplied thereto via the supply hole 55A from the high pressure fluid supplying unit 56.

In a case of the steam turbines 120, 130, and 140 illustrated in FIG. 6, the sealing device illustrated in FIGS. 2 and 3 is applied. That is, the rotor 61 constitutes the rotating body 51, the casing 62 and the steam nozzle unit 64A constitute the stationary body 52, and the gap 65A constitutes the gap 53.

In a case of the high pressure steam turbine 120, a source of supply of the high pressure fluid supplying unit 56 that supplies the high pressure fluid H is a space from an outlet of the high pressure evaporator 21 (high pressure drum 20) to the inside of the high pressure secondary superheater 25 through the high pressure primary superheater 22 in the combined cycle plant 100, and the source of supply is connected to the supply hole 55A that is the inside of the high pressure steam turbine 120 via a connection line (not illustrated). The superheated steam G to be supplied to the high pressure steam turbine 120 passes through the connection line 48 from the high pressure secondary superheater 25, but a pressure thereof is lowered in a process of passing through the connection line 48. Thus, the steam in the space from the outlet of the high pressure evaporator 21 to the inside of the high pressure secondary superheater 25 through the high pressure primary superheater 22 has a higher pressure and a lower temperature than those of the superheated steam G supplied to the high pressure steam turbine 120. Thus, cooled steam having a higher pressure and a lower temperature than those of the superheated steam G supplied to the high pressure steam turbine 120 can be supplied to the inside of the high pressure steam turbine 120 as the high pressure fluid H.

In a case of the medium pressure steam turbine 130, a source of supply of the high pressure fluid supplying unit 56 that supplies the high pressure fluid H is a space from an outlet of the medium pressure evaporator 16 (medium pressure drum 15) to the inside of the secondary reheater 24 through the medium pressure superheater 19 and the primary reheater 23 in the combined cycle plant 100, and the source of supply is connected to the supply hole 55A that is the inside of the medium pressure steam turbine 130 via a connection line (not illustrated). The superheated steam G to be supplied to the medium pressure steam turbine 130 passes through the connection line 42 from the secondary reheater 24, but a pressure thereof is lowered in a process of passing through the connection line 42. Thus, the steam in the space from the outlet of the medium pressure evaporator 16 to the inside of the secondary reheater 24 through the medium pressure superheater 19 and the primary reheater 23 has a higher pressure and a lower temperature than those of the superheated steam G supplied to the medium pressure steam turbine 130. Thus, cooled steam having a higher pressure and a lower temperature than those of the superheated steam G supplied to the medium pressure steam turbine 130 can be supplied to the inside of the medium pressure steam turbine 130 as the high pressure fluid H.

In a case of the low pressure steam turbine 140, a source of supply of the high pressure fluid supplying unit 56 that supplies the high pressure fluid H is a space from an outlet of the low pressure evaporator 12 (low pressure drum 11) to the inside of the low pressure superheater 17 in the combined cycle plant 100, and the source of supply is connected to the supply hole 55A that is the inside of the low pressure steam turbine 140 via a connection line (not illustrated). The superheated steam G to be supplied to the low pressure steam turbine 140 passes through the connection line 33 from the low pressure superheater 17, but a pressure thereof is lowered in a process of passing through the connection line 33. Thus, the steam in the space from the outlet of the low pressure evaporator 12 to the inside of the low pressure superheater 17 has a higher pressure and a lower temperature than those of the superheated steam G supplied to the low pressure steam turbine 140. Thus, cooled steam having a higher pressure and a lower temperature than those of the superheated steam G supplied to the low pressure steam turbine 140 can be supplied to the inside of the low pressure steam turbine 140 as the high pressure fluid H.

In this way, with the sealing device applied to the steam turbines 120, 130, and 140 illustrated in FIG. 6, the high pressure fluid H having a higher pressure and a lower temperature than those of the fluid F supplied to the steam turbines 120, 130, and 140 is ejected to the gap 65A between the steam nozzle unit 64A and the outer peripheral surface of the rotor 61, so that the sealing performance in the gap 65A can be improved, and the fluid F supplied to the steam turbines 120, 130, and 140 can be prevented from leaking out. Additionally, the high pressure fluid H having a higher pressure and a lower temperature than those of the fluid F supplied to the steam turbines 120, 130, and 140 is ejected to the gap 65A between the steam nozzle unit 64A and the outer peripheral surface of the rotor 61, so that the rotor 61 can be cooled. As a result, operation efficiency of the steam turbines 120, 130, and 140 can be improved, and cycle efficiency can be improved.

Figure 7:
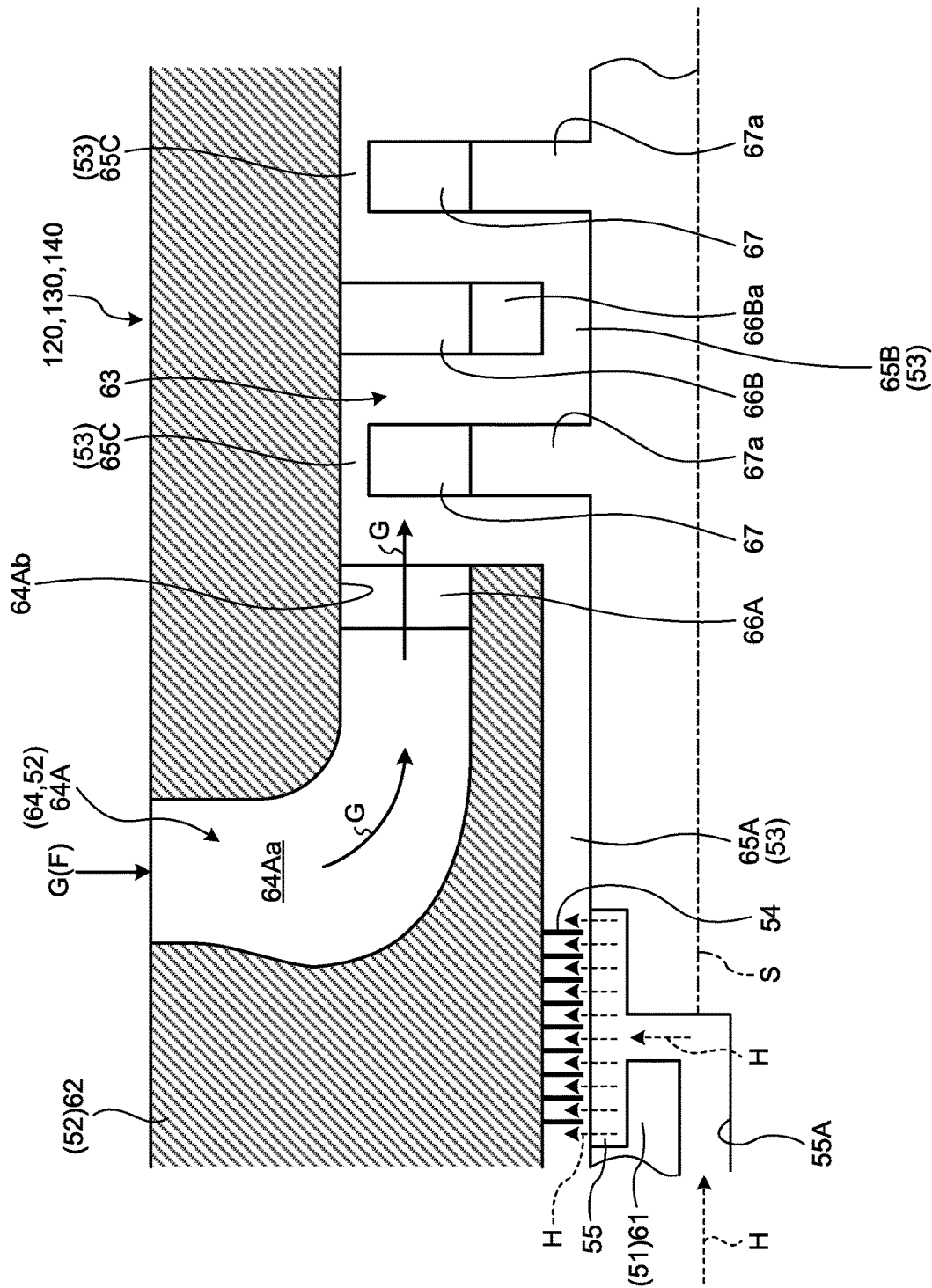
FIG. 7 is a schematic configuration diagram illustrating an example of the sealing device according to the embodiment of the present invention.

In the sealing device illustrated in FIG. 7, for the steam turbines 120, 130, and 140, the fin 54 is arranged in the gap 65A extending from the steam nozzle unit 64A toward the rotor 61, and the through hole 55 is arranged to be opened toward the steam nozzle unit 64A in the rotor 61. The through hole 55 communicates with a supply hole 55A passing through the rotor 61 from the outside of the casing 62, and the high pressure fluid H is supplied thereto via the supply hole 55A from the high pressure fluid supplying unit 56.

In a case of the steam turbines 120, 130, and 140 illustrated in FIG. 7, the sealing device illustrated in FIGS. 4 and 5 is applied. That is, the rotor 61 constitutes the rotating body 51, the casing 62 and the steam nozzle unit 64A constitute the stationary body 52, and the gap 65A constitutes the gap 53. As described above, each source of supply in the combined cycle plant 100 of the high pressure fluid supplying unit 56 that supplies the high pressure fluid H is connected to the supply hole 55A via a connection line (not illustrated) in the high pressure steam turbine 120, the medium pressure steam turbine 130, and the low pressure steam turbine 140.

In this way, with the sealing device applied to the steam turbines 120, 130, and 140 illustrated in FIG. 7, the high pressure fluid H having a higher pressure and a lower temperature than those of the fluid F supplied to the steam turbines 120, 130, and 140 is ejected to the gap 65A between the steam nozzle unit 64A and the outer peripheral surface of the rotor 61, so that the sealing performance in the gap 65A can be improved, and the fluid F supplied to the steam turbines 120, 130, and 140 can be prevented from leaking out. Additionally, the high pressure fluid H having a higher pressure and a lower temperature than those of the fluid F supplied to the steam turbines 120, 130, and 140 is ejected to the gap 65A between the steam nozzle unit 64A and the outer peripheral surface of the rotor 61, so that the rotor 61 can be cooled. As a result, the operation efficiency of the steam turbines 120, 130, and 140 can be improved, and the cycle efficiency can be improved.

Figure 8:
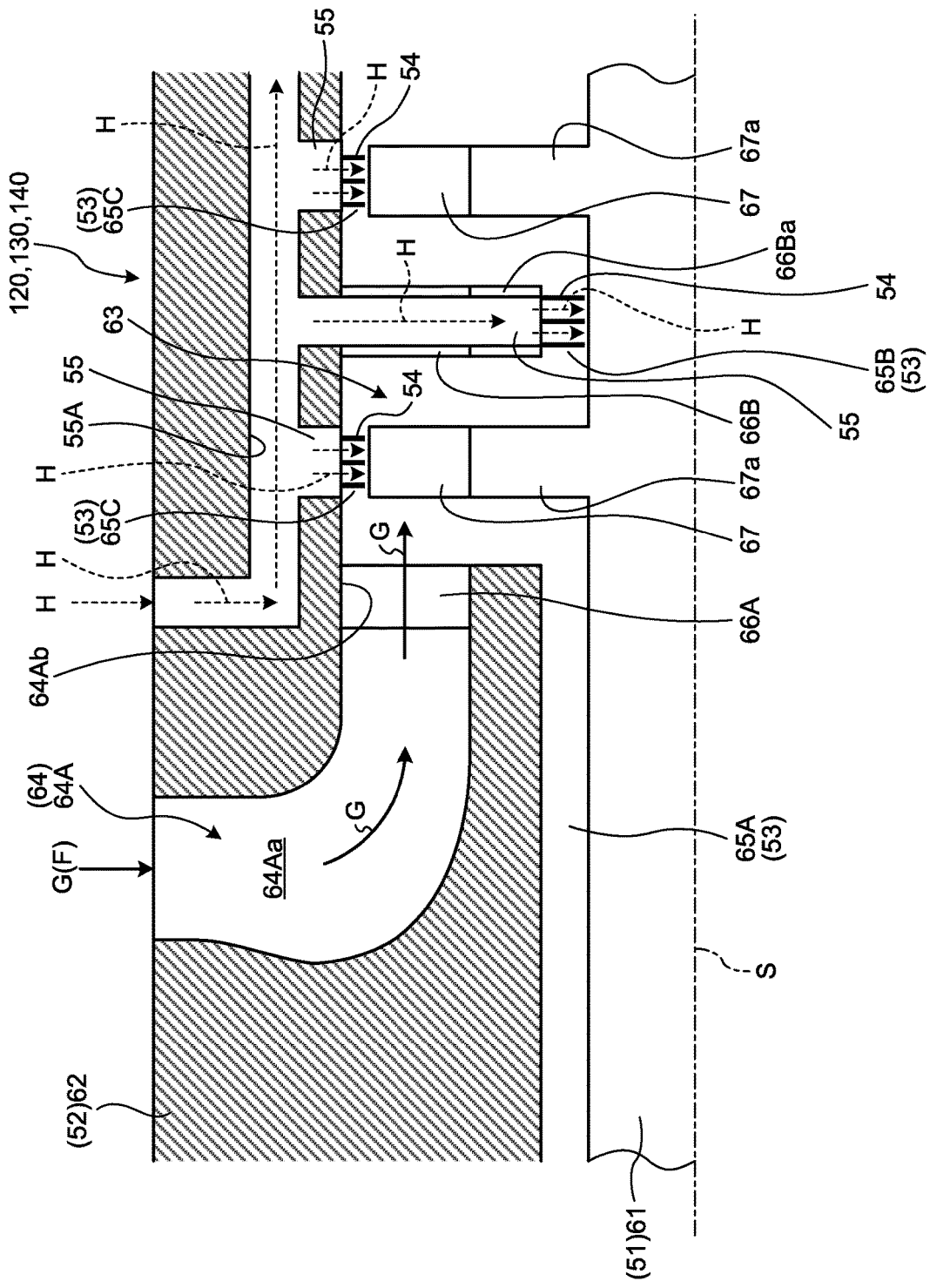
FIG. 8 is a schematic configuration diagram illustrating an example of the sealing device according to the embodiment of the present invention.

In the sealing device illustrated in FIG. 8, for the steam turbines 120, 130, and 140, the fin 54 is arranged in the gap 65B extending from the steam passage stator vane 66B toward the rotor 61, and the through hole 55 is arranged to be opened toward the rotor 61 in the casing 62 and the steam passage stator vane 66B. In the sealing device illustrated in FIG. 8, for the steam turbines 120, 130, and 140, the fin 54 is arranged in the gap 65C extending from the casing 62 toward the rotor blade 67, and the through hole 55 is arranged to be opened toward the rotor blade 67 in the casing 62. Each through hole 55 communicates with the supply hole 55A passing through the casing 62 from the outside of the casing 62, and the high pressure fluid H is supplied thereto via the supply hole 55A from the high pressure fluid supplying unit 56.

In a case of the steam turbines 120, 130, and 140 illustrated in FIG. 8, the sealing device illustrated in FIGS. 2 and 3 is applied. That is, the rotor 61 and the rotor blade 67 constitute the rotating body 51, the casing 62 and the steam passage stator vane 66B constitute the stationary body 52, and the gaps 65B and 65C constitute the gap 53. As described above, each source of supply in the combined cycle plant 100 of the high pressure fluid supplying unit 56 that supplies the high pressure fluid H is connected to the supply hole 55A via a connection line (not illustrated) in the high pressure steam turbine 120, the medium pressure steam turbine 130, and the low pressure steam turbine 140.

In this way, with the sealing device applied to the steam turbines 120, 130, and 140 illustrated in FIG. 8, the high pressure fluid H having a higher pressure and a lower temperature than those of the fluid F supplied to the steam turbines 120, 130, and 140 is ejected to the gap 65B between the steam passage stator vane 66B and the outer peripheral surface of the rotor 61, so that the sealing performance in the gap 65B can be improved, and the fluid F supplied to the steam turbines 120, 130, and 140 can be prevented from leaking out. Additionally, the high pressure fluid H having a higher pressure and a lower temperature than those of the fluid F supplied to the steam turbines 120, 130, and 140 is ejected to the gap 65B between the steam passage stator vane 66B and the outer peripheral surface of the rotor 61, so that the rotor 61 can be cooled. As a result, the operation efficiency of the steam turbines 120, 130, and 140 can be improved, and the cycle efficiency can be improved. The high pressure fluid H having a higher pressure and a lower temperature than those of the fluid F supplied to the steam turbines 120, 130, and 140 passes through the steam passage stator vane 66B, so that the steam passage stator vane 66B can be cooled. As a result, the operation efficiency of the steam turbines 120, 130, and 140 can be improved, and the cycle efficiency can be improved.

With the sealing device applied to the steam turbines 120, 130, and 140 illustrated in FIG. 8, the high pressure fluid H having a higher pressure and a lower temperature than those of the fluid F supplied to the steam turbines 120, 130, and 140 is ejected to the gap 65C between the casing 62 and the rotor blade 67, so that the sealing performance in the gap 65C can be improved, and the fluid F supplied to the steam turbines 120, 130, and 140 can be prevented from leaking out. Additionally, the high pressure fluid H having a higher pressure and a lower temperature than those of the fluid F supplied to the steam turbines 120, 130, and 140 is ejected to the gap 65C between the casing 62 and the rotor blade 67, so that the rotor blade 67 can be cooled. As a result, the operation efficiency of the steam turbines 120, 130, and 140 can be improved, and the cycle efficiency can be improved.

Figure 9:
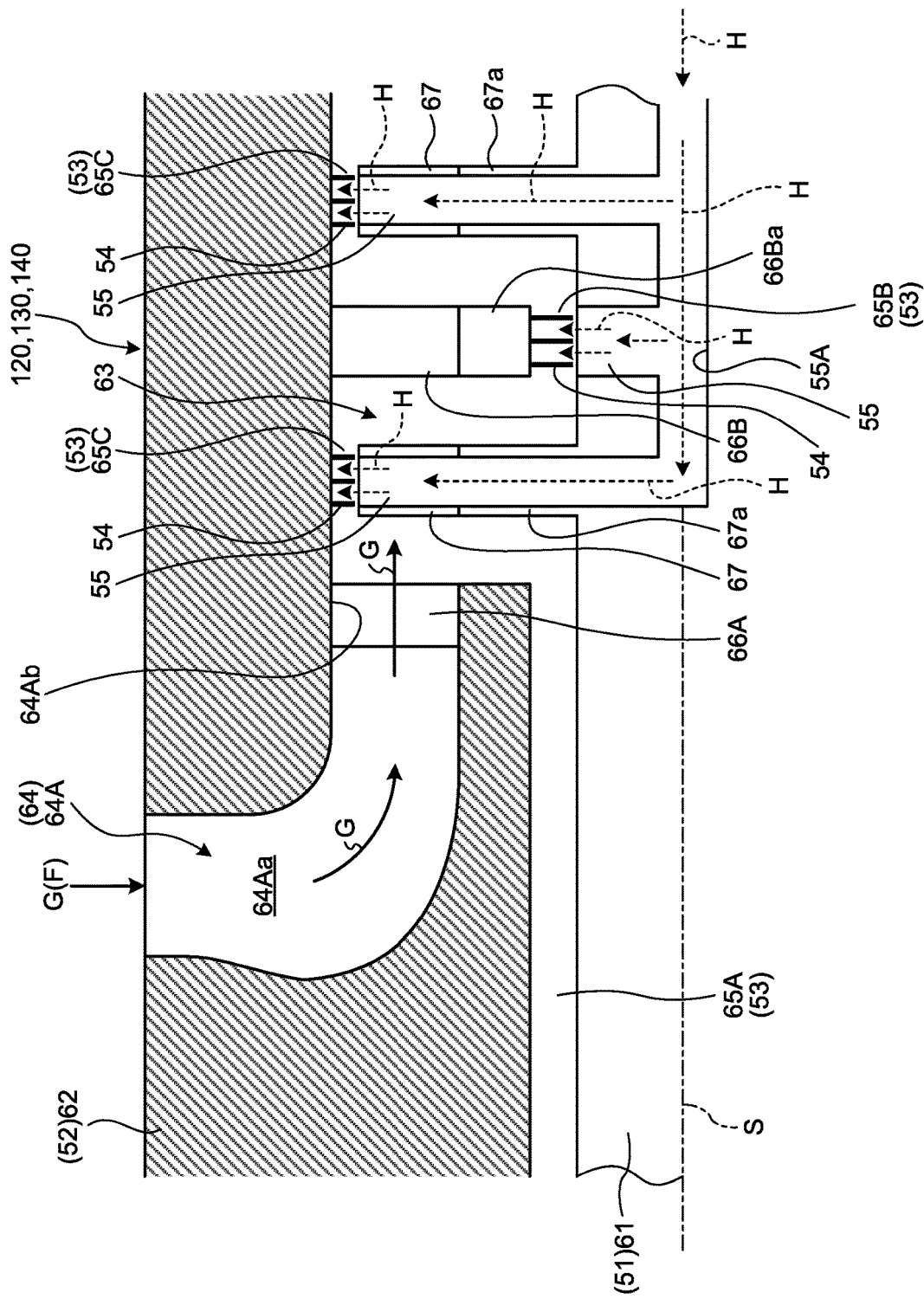
FIG. 9 is a schematic configuration diagram illustrating an example of the sealing device according to the embodiment of the present invention.

In the sealing device illustrated in FIG. 9, for the steam turbines 120, 130, and 140, the fin 54 is arranged in the gap 65B extending from the steam passage stator vane 66B toward the rotor 61, and the through hole 55 is arranged to be opened toward the steam passage stator vane 66B in the rotor 61. In the sealing device illustrated in FIG. 9, for the steam turbines 120, 130, and 140, the fin 54 is arranged in the gap 65C extending from the casing 62 toward the rotor blade 67, and the through hole 55 is arranged to be opened toward the casing 62 in the rotor 61 and the rotor blade 67. Each through hole 55 communicates with the supply hole 55A passing through the rotor 61 from the outside of the casing 62, and the high pressure fluid H is supplied thereto via the supply hole 55A from the high pressure fluid supplying unit 56.

In a case of the steam turbines 120, 130, and 140 illustrated in FIG. 9, the sealing device illustrated in FIGS. 4 and 5 is applied. That is, the rotor 61 and the rotor blade 67 constitute the rotating body 51, the casing 62 and the steam passage stator vane 66B constitute the stationary body 52, and the gaps 65B and 65C constitute the gap 53. As described above, each source of supply in the combined cycle plant 100 of the high pressure fluid supplying unit 56 that supplies the high pressure fluid H is connected to the supply hole 55A via a connection line (not illustrated) in the high pressure steam turbine 120, the medium pressure steam turbine 130, and the low pressure steam turbine 140.

In this way, with the sealing device applied to the steam turbines 120, 130, and 140 illustrated in FIG. 9, the high pressure fluid H having a higher pressure and a lower temperature than those of the fluid F supplied to the steam turbines 120, 130, and 140 is ejected to the gap 65B between the steam passage stator vane 66B and the outer peripheral surface of the rotor 61, so that the sealing performance in the gap 65B can be improved, and the fluid F supplied to the steam turbines 120, 130, and 140 can be prevented from leaking out. Additionally, the high pressure fluid H having a higher pressure and a lower temperature than those of the fluid F supplied to the steam turbines 120, 130, and 140 is ejected to the gap 65B between the steam passage stator vane 66B and the outer peripheral surface of the rotor 61, so that the rotor 61 can be cooled. As a result, the operation efficiency of the steam turbines 120, 130, and 140 can be improved, and the cycle efficiency can be improved.

With the sealing device applied to the steam turbines 120, 130, and 140 illustrated in FIG. 9, the high pressure fluid H having a higher pressure and a lower temperature than those of the fluid F supplied to the steam turbines 120, 130, and 140 is ejected to the gap 65C between the casing 62 and the rotor blade 67, so that the sealing performance in the gap 65C can be improved, and the fluid F supplied to the steam turbines 120, 130, and 140 can be prevented from leaking out. Additionally, the high pressure fluid H having a higher pressure and a lower temperature than those of the fluid F supplied to the steam turbines 120, 130, and 140 is ejected to the gap 65C between the casing 62 and the rotor blade 67, so that the rotor blade 67 can be cooled. As a result, the operation efficiency of the steam turbines 120, 130, and 140 can be improved, and the cycle efficiency can be improved. The high pressure fluid H having a higher pressure and a lower temperature than those of the fluid F supplied to the steam turbines 120, 130, and 140 passes through the rotor blade 67, so that the rotor blade 67 can be cooled. As a result, the operation efficiency of the steam turbines 120, 130, and 140 can be improved, and the cycle efficiency can be improved.

In the sealing device illustrated in FIG. 10, for the steam turbines 120, 130, and 140, the fin 54 is arranged in the gap 65B extending from the steam passage stator vane 66B toward the rotor 61, and the through hole 55 is arranged to be opened toward the steam passage stator vane 66B in the rotor 61. In the sealing device illustrated in FIG. 10, for the steam turbines 120, 130, and 140, the fin 54 is arranged in the gap 65C extending from the casing 62 toward the rotor blade 67, and the through hole 55 is arranged to be opened toward the casing 62 in the rotor 61 and the rotor blade 67. Each through hole 55 passes through the casing 62 from the outside of the casing 62 to be once opened to the gap 65A, communicates with the supply hole 55A passing through the rotor 61 from the gap 65A, and the high pressure fluid H is supplied thereto via the supply hole 55A from the high pressure fluid supplying unit 56. Around a part where the supply hole 55A is once opened to the gap 65A, the fin 54 is arranged in the gap 65A extending from the steam nozzle unit 64A toward the rotor 61.

In a case of the steam turbines 120, 130, and 140 illustrated in FIG. 10, the sealing device illustrated in FIGS. 4 and 5 is applied. That is, the rotor 61 and the rotor blade 67 constitute the rotating body 51, the casing 62 and the steam passage stator vane 66B constitute the stationary body 52, and the gaps 65B and 65C constitute the gap 53. As described above, each source of supply in the combined cycle plant 100 of the high pressure fluid supplying unit 56 that supplies the high pressure fluid H is connected to the supply hole 55A via a connection line (not illustrated) in the high pressure steam turbine 120, the medium pressure steam turbine 130, and the low pressure steam turbine 140.

In this way, with the sealing device applied to the steam turbines 120, 130, and 140 illustrated in FIG. 10, the high pressure fluid H having a higher pressure and a lower temperature than those of the fluid F supplied to the steam turbines 120, 130, and 140 is ejected to the gap 65B between the steam passage stator vane 66B and the outer peripheral surface of the rotor 61, so that the sealing performance in the gap 65B can be improved, and the fluid F supplied to the steam turbines 120, 130, and 140 can be prevented from leaking out. Additionally, the high pressure fluid H having a higher pressure and a lower temperature than those of the fluid F supplied to the steam turbines 120, 130, and 140 is ejected to the gap 65B between the steam passage stator vane 66B and the outer peripheral surface of the rotor 61, so that the rotor 61 can be cooled. As a result, the operation efficiency of the steam turbines 120, 130, and 140 can be improved, and the cycle efficiency can be improved.

With the sealing device applied to the steam turbines 120, 130, and 140 illustrated in FIG. 10, the high pressure fluid H having a higher pressure and a lower temperature than those of the fluid F supplied to the steam turbines 120, 130, and 140 is ejected to the gap 65C between the casing 62 and the rotor blade 67, so that the sealing performance in the gap 65C can be improved, and the fluid F supplied to the steam turbines 120, 130, and 140 can be prevented from leaking out. Additionally, the high pressure fluid H having a higher pressure and a lower temperature than those of the fluid F supplied to the steam turbines 120, 130, and 140 is ejected to the gap 65C between the casing 62 and the rotor blade 67, so that the rotor blade 67 can be cooled. As a result, the operation efficiency of the steam turbines 120, 130, and 140 can be improved, and the cycle efficiency can be improved. The high pressure fluid H having a higher pressure and a lower temperature than those of the fluid F supplied to the steam turbines 120, 130, and 140 passes through the rotor blade 67, so that the rotor blade 67 can be cooled. As a result, the operation efficiency of the steam turbines 120, 130, and 140 can be improved, and the cycle efficiency can be improved.

With the sealing device applied to the steam turbines 120, 130, and 140 illustrated in FIG. 10, the supply hole 55A is once opened to the gap 65A between the steam nozzle unit 64A and the rotor 61, and the fin 54 is arranged in the gap 65A extending from the steam nozzle unit 64A toward the rotor 61 around the part where the supply hole 55A is opened, so that the fluid F supplied to the steam turbines 120, 130, and 140 can be prevented from leaking out in the gap 65A between the steam nozzle unit 64A and the rotor 61.

With the sealing device illustrated in FIGS. 6 to 10, in the combined cycle plant 100, the cooled steam having a higher pressure and a lower temperature than those of the superheated steam supplied to the steam turbines 120, 130, and 140 can be supplied to the inside of the steam turbines 120, 130, and 140 as the high pressure fluid H. As a result, a high-temperature part within the steam turbines 120, 130, and 140 can be cooled without requiring another power source. The steam generated in the combined cycle plant 100 is used and the fluid within the steam turbines 120, 130, and 140 is not used, so that the operation efficiency of the steam turbines 120, 130, and 140 can be prevented from being deteriorated, and as a result, the cycle efficiency can be prevented from being deteriorated. The sealing device functions even when the steam generated in the combined cycle plant 100 is not used as the high pressure fluid H.

In the sealing device illustrated in FIGS. 6 to 10, in a case of the high pressure steam turbine 120, a source of supply of the high pressure fluid supplying unit 56 that supplies the high pressure fluid H is a space from an outlet of the high pressure primary superheater 22 to an inlet of the high pressure secondary superheater 25, and the source of supply is preferably connected to the supply hole 55A that is the inside of the high pressure steam turbine 120 via a connection line (not illustrated). When the cooled steam is supplied as the high pressure fluid H to the inside of the high pressure steam turbine 120 from the connection line 47 between the outlet of the high pressure primary superheater 22 and the inlet of the high pressure secondary superheater 25, the steam supplied to the high pressure secondary superheater 25 is reduced, so that the superheating efficiency in the high pressure secondary superheater 25 is improved, and the temperature of the superheated steam G supplied to the high pressure steam turbine 120 is increased. As a result, the operation efficiency of the high pressure steam turbine 120 can be improved, and the cycle efficiency can be improved. On the other hand, when the cooled steam is supplied as the high pressure fluid H to the inside of the high pressure steam turbine 120 from the connection line 47 between the outlet of the high pressure primary superheater 22 and the inlet of the high pressure secondary superheater 25, an amount of steam obtained from the high pressure evaporator 21 can be increased in a case in which the temperature of the superheated steam G supplied to the high pressure steam turbine 120 is fixed, so that a supply amount of the superheated steam G to the high pressure steam turbine 120 can be increased. As a result, the operation efficiency of the high pressure steam turbine 120 can be improved, and the cycle efficiency can be improved.

In a case of the medium pressure steam turbine 130, a source of supply of the high pressure fluid supplying unit 56 that supplies the high pressure fluid H is a space from an outlet of the medium pressure superheater 19 to an inlet of the primary reheater 23, and the source of supply is preferably connected to the supply hole 55A that is the inside of the medium pressure steam turbine 130 via a connection line (not illustrated). When the cooled steam is supplied as the high pressure fluid H to the inside of the medium pressure steam turbine 130 from the connection line 38 (and part of the connection line 40) between the outlet of the medium pressure superheater 19 and the inlet of the primary reheater 23, the steam supplied to the primary reheater 23 and the secondary reheater 24 is reduced, so that the superheating efficiency in the primary reheater 23 and the secondary reheater 24 is improved, and the temperature of the superheated steam G supplied to the medium pressure steam turbine 130 is increased. As a result, the operation efficiency of the medium pressure steam turbine 130 can be improved, and the cycle efficiency can be improved. On the other hand, when the cooled steam is supplied as the high pressure fluid H to the inside of the medium pressure steam turbine 130 from the connection line 38 (and part of the connection line 40) between the outlet of the medium pressure superheater 19 and the inlet of the primary reheater 23, an amount of steam obtained from the medium pressure evaporator 16 can be increased in a case in which the temperature of the superheated steam G supplied to the medium pressure steam turbine 130 is fixed, so that the supply amount of the superheated steam G to the medium pressure steam turbine 130 can be increased. As a result, the operation efficiency of the medium pressure steam turbine 130 can be improved, and the cycle efficiency can be improved.

In a case of the medium pressure steam turbine 130, a source of supply of the high pressure fluid supplying unit 56 that supplies the high pressure fluid H is a space from an outlet of the primary reheater 23 to an inlet of the secondary reheater 24, and the source of supply is preferably connected to the supply hole 55A that is the inside of the medium pressure steam turbine 130 via a connection line (not illustrated). When the cooled steam is supplied as the high pressure fluid H to the inside of the medium pressure steam turbine 130 from the connection line 41 between the outlet of the primary reheater 23 and the inlet of the secondary reheater 24, the steam supplied to the secondary reheater 24 is reduced, so that the superheating efficiency in the secondary reheater 24 is improved, and the temperature of the superheated steam G supplied to the medium pressure steam turbine 130 is increased. As a result, the operation efficiency of the medium pressure steam turbine 130 can be improved, and the cycle efficiency can be improved. On the other hand, when the cooled steam is supplied as the high pressure fluid H to the inside of the medium pressure steam turbine 130 from the connection line 41 between the outlet of the primary reheater 23 and the inlet of the secondary reheater 24, an amount of steam obtained from the medium pressure evaporator 16 can be increased in a case in which the temperature of the superheated steam G supplied to the medium pressure steam turbine 130 is fixed, so that the supply amount of the superheated steam G to the medium pressure steam turbine 130 can be increased. As a result, the operation efficiency of the medium pressure steam turbine 130 can be improved, and the cycle efficiency can be improved.

In a case of the low pressure steam turbine 140, a source of supply of the high pressure fluid supplying unit 56 that supplies the high pressure fluid H is a space from an outlet of the low pressure evaporator 12 to an inlet of the low pressure superheater 17, and the source of supply is preferably connected to the supply hole 55A that is the inside of the low pressure steam turbine 140 via a connection line (not illustrated). When the cooled steam is supplied as the high pressure fluid H to the inside of the low pressure steam turbine 140 from the connection line 32 between the outlet of the low pressure evaporator 12 and the inlet of the low pressure superheater 17, the steam supplied to the low pressure superheater 17 is reduced, so that the superheating efficiency in the low pressure superheater 17 is improved, and the temperature of the superheated steam G supplied to the low pressure steam turbine 140 is increased. As a result, the operation efficiency of the low pressure steam turbine 140 can be improved, and the cycle efficiency can be improved. On the other hand, when the cooled steam is supplied as the high pressure fluid H to the inside of the low pressure steam turbine 140 from the connection line 32 between the outlet of the low pressure evaporator 12 and the inlet of the low pressure superheater 17, an amount of steam obtained from the low pressure evaporator 12 can be increased in a case in which the temperature of the superheated steam G supplied to the low pressure steam turbine 140 is fixed, so that the supply amount of the superheated steam G to the low pressure steam turbine 140 can be increased. As a result, the operation efficiency of the low pressure steam turbine 140 can be improved, and the cycle efficiency can be improved.

The rotary machine can include the gas turbine 110 described above, and the sealing device illustrated in FIGS. 6 to 10 can also be applied to the gas turbine 110. In this case, as the high pressure fluid H supplied to the compressor 111 of the gas turbine 110, high pressure air compressed by the compressor 111 serving as a source of supply in the combined cycle plant 100 can be used, or high pressure air of a source of supply outside the combined cycle plant 100 may be used. As the high pressure fluid H supplied to the turbine 113 of the gas turbine 110, high pressure air compressed by the compressor 111 serving as a source of supply in the combined cycle plant 100 can be used, or high pressure air of a source of supply outside the combined cycle plant 100 may be used.

REFERENCE SIGNS LIST 1 boiler
10 low pressure economizer
11 low pressure drum
12 low pressure evaporator
13 medium pressure economizer
14 high pressure primary economizer
15 medium pressure drum
16 medium pressure evaporator
17 low pressure superheater
18 high pressure secondary economizer
19 medium pressure superheater
20 high pressure drum
21 high pressure evaporator
22 high pressure primary superheater
23 primary reheater
24 secondary reheater
25 high pressure secondary superheater
26 condensate pump
27 medium pressure water supply pump
28 high pressure water supply pump
30 connection line
31 connection line
31a low pressure branch line
31b medium pressure branch line
31c high pressure branch line
32 connection line
33 connection line
34 connection line
35 connection line
36 flow rate regulating valve
37 connection line
38 connection line
39 connection line
40 connection line
41 connection line
42 connection line
43 connection line
44 connection line
45 flow rate regulating valve
46 connection line
47 connection line
48 connection line
51 rotating body
52 stationary body
53 gap
54 fin
55 through hole
55A supply hole
56 high pressure fluid supplying unit
61 rotor
62 casing
63 steam passage (fluid passage)
64 steam supplying unit
64A steam nozzle unit (fluid nozzle unit)
64Aa steam nozzle chamber (fluid nozzle chamber)
64Ab opening
65A gap
65B gap
65C gap
66A nozzle unit stator vane
66B steam passage stator vane (stator vane)
66Ba annular member
67 rotor blade
67a annular member
100 combined cycle plant
110 gas turbine
111 compressor
112 burner
113 turbine
113a flue gas duct
114 compressor inlet air
115 fuel
120 high pressure steam turbine
130 medium pressure steam turbine
140 low pressure steam turbine
150 power generator
160 condenser
F fluid
G superheated steam
H high pressure fluid
S axis

The invention claimed is:

1. A sealing device applied to a rotary machine, comprising:
a fin extending from a stationary body toward a rotating body in a first gap between the stationary body and the rotating body, the fin being not in contact with the rotating body;
a through hole opened in at least one of the stationary body and the rotating body on an upstream side of the fin in a flow direction of a fluid to flow into the first gap between the stationary body and the rotating body, the through hole being opened toward an upstream side of the fluid to flow in the first gap between the stationary body and the rotating body; and
a high pressure fluid supplying unit configured to supply a high pressure fluid to the first gap between the stationary body and the rotating body from the through hole, the high pressure fluid having a higher pressure than the fluid to flow into the first gap between the stationary body and the rotating body,
wherein the high pressure fluid supplied from the through hole to the first gap between the stationary body and the rotating body boosts a vortex to be stronger, the vortex being generated when the fluid collides with the fin on the upstream side of the flow direction of the fluid at the fin,
wherein the rotary machine includes:
a rotor extending along a rotational axis of the rotor in the rotating body,
a casing for storing the rotor,
a fluid passage provided between the rotor and the casing along an extending direction of the rotor, and
a fluid nozzle unit having an annular shape that surrounds an outer peripheral surface of the rotor, the fluid nozzle unit being attached to the casing with a second gap communicating with the fluid passage between an outer face of the fluid nozzle unit and an outer peripheral surface of the rotor, the fluid nozzle unit including a fluid nozzle chamber to which a superheated fluid being supplied and which is formed inside the fluid nozzle unit in an annular shape and an opening communicating with the fluid passage from the fluid nozzle chamber toward the extending direction of the rotor, the fluid nozzle unit being in the stationary body,
wherein the fin is arranged in the second gap between the outer face of the fluid nozzle unit and the outer peripheral surface of the rotor and extending from the fluid nozzle unit toward the rotor,
wherein the through hole is arranged to be opened toward the fluid nozzle unit in the rotor, and
wherein the high pressure fluid supplying unit supplies, to the rotary machine, a high pressure fluid having a higher pressure and a lower temperature than the fluid supplied to the rotary machine to flow into the second gap between the outer face of the fluid nozzle unit and the outer peripheral surface of the rotor.

2. The sealing device applied to the rotary machine according to claim 1, wherein the fin is one of a plurality of fins arranged in the flow direction of the fluid, and the through hole is arranged on an upstream side of the flow direction of the fluid with respect to each of the fins.

3. The sealing device applied to the rotary machine according to claim 1,
wherein the through hole is arranged to be opened toward the rotor in the fluid nozzle unit.

4. The sealing device applied to the rotary machine according to claim 1, wherein
the rotary machine further includes a stator vane extending from the casing in the fluid passage with a third gap communicating with the fluid passage between the stator vane and an outer peripheral surface of the rotor in the stationary body,
wherein the fin is arranged in the third gap between the stator vane and the outer peripheral surface of the rotor and a fourth gap between a rotor blade and the casing, and
wherein the through hole is arranged in the casing and the stator vane.

5. The sealing device applied to the rotary machine according to claim 1
wherein the casing of the rotary machine is configured for storing the rotor in the stationary body,
wherein the rotary machine further includes a stator vane extending from the casing in the fluid passage with a third gap communicating with the fluid passage between the stator vane and an outer peripheral surface of the rotor in the stationary body,
wherein the fin is arranged in the third gap between the stator vane and the outer peripheral surface of the rotor and a fourth gap between the rotor blade and the casing, and
wherein the through hole is arranged in the rotor and the rotor blade.

6. A sealing device applied to a rotary machine, comprising:
a fin extending from a stationary body toward a rotating body in a first gap between the stationary body and the rotating body, the fin being not in contact with the rotating body;
a through hole formed to be opened in at least one of the stationary body and the rotating body on an upstream side of the fin in a flow direction of a fluid to flow into the first gap between the stationary body and the rotating body, the through hole being opened toward an upstream side of the fluid to flow in the first gap between the stationary body and the rotating body; and
a high pressure fluid supplying unit configured to supply a high pressure fluid to the first gap between the stationary body and the rotating body from the through hole, the high pressure fluid having a higher pressure than the fluid to flow into the first gap between the stationary body and the rotating body, wherein
wherein the rotary machine includes:
a rotor extending along a rotational axis of the rotor in the rotating body,
a casing for storing the rotor in the stationary body,
a fluid passage arranged between the rotor and the casing along an extending direction of the rotor,
a stator vane extending from the casing in the fluid passage with a second gap communicating with the fluid passage between the stator vane and an outer peripheral surface of the rotor in the stationary body, and
a rotor blade extending from the rotor in the fluid passage with a third gap communicating with the fluid passage between the rotor blade and the casing in the rotating body,
wherein the fin is arranged in the second gap between the stator vane and the outer peripheral surface of the rotor and the third gap between the rotor blade and the casing,
wherein the through hole is arranged in the rotor and the rotor blade,
wherein the high pressure fluid supplying unit supplies, to the rotary machine, a high pressure fluid having a higher pressure and a lower temperature than the fluid that is supplied to the rotary machine to flow into a fourth gap between an outer face of the fluid nozzle unit and an outer peripheral surface of the rotor,
wherein the rotary machine includes a fluid nozzle unit having an annular shape that surrounds an outer circumference peripheral surface of the rotor, the fluid nozzle unit being attached to the casing with the fourth gap communicating with the fluid passage between an outer face of the fluid nozzle unit and an outer peripheral surface of the rotor, the fluid nozzle unit including a fluid nozzle chamber to which a superheated fluid being supplied and which is formed inside the fluid nozzle unit in an annular shape and an opening communicating with the fluid passage from the fluid nozzle chamber toward the extending direction of the rotor, the fluid nozzle unit being in the stationary body, and wherein the sealing device further includes:
- a supply hole that is once opened to the fourth gap between the outer face of the fluid nozzle unit and an outer peripheral surface of the rotor, and communicates with the through hole via the rotor; and
- a fin extending from the fluid nozzle unit toward the rotor around a part where the supply hole is once opened to the fourth gap between the outer face of the fluid nozzle unit and the outer peripheral surface of the rotor.

* * * * *